United States Patent
Landauer et al.

(10) Patent No.: US 10,282,953 B2
(45) Date of Patent: May 7, 2019

(54) ELECTRONIC TAMPER DETECTION DEVICE

(71) Applicant: NXP B.V., Eindhoven (NL)

(72) Inventors: Gerhard Martin Landauer, Gratkorn (AT); Ivan Jesus Rebollo Pimentel, Gratkorn (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/667,602

(22) Filed: Aug. 2, 2017

(65) Prior Publication Data

US 2018/0040220 A1  Feb. 8, 2018

(30) Foreign Application Priority Data

Aug. 2, 2016  (EP) ..................................... 16182327

(51) Int. Cl.
| | |
|---|---|
| G08B 13/24 | (2006.01) |
| G06F 21/86 | (2013.01) |
| G06Q 10/08 | (2012.01) |
| G08B 29/08 | (2006.01) |
| G06K 19/073 | (2006.01) |
| G06K 19/077 | (2006.01) |
| G09F 3/03 | (2006.01) |
| G08B 13/08 | (2006.01) |

(52) U.S. Cl.
CPC ......... *G08B 13/2417* (2013.01); *G06F 21/86* (2013.01); *G06K 19/07372* (2013.01); *G06K 19/07798* (2013.01); *G06Q 10/08* (2013.01); *G08B 13/08* (2013.01); *G08B 13/24* (2013.01); *G08B 13/2474* (2013.01); *G08B 29/08* (2013.01); *G09F 3/0335* (2013.01)

(58) Field of Classification Search
None
See application file for complete search history.

(56) References Cited

U.S. PATENT DOCUMENTS

| | | | | |
|---|---|---|---|---|
| 5,298,884 A | * | 3/1994 | Gilmore | ................. G08B 21/22 340/10.41 |
| 5,457,748 A | * | 10/1995 | Bergum | ................. G06F 21/86 380/270 |
| 6,050,622 A | | 4/2000 | Gustafson | |

(Continued)

OTHER PUBLICATIONS

Extended European Search Report for Patent Appln. No. 16182327.3 (dated Mar. 16, 2017).

*Primary Examiner* — Curtis J King

(57) ABSTRACT

According to a first aspect of the present disclosure, an electronic tamper detection device is provided, comprising a radio frequency antenna, a tamper loop, a power level determination unit and a tamper measurement unit, wherein: the power level determination unit is configured to determine a power level of the tamper detection device; the tamper measurement unit is configured to generate a measurement signal and to transmit said measurement signal through the tamper loop; the tamper measurement unit is further configured to adapt the measurement signal in dependence on the power level. According to a second aspect of the present disclosure, a corresponding tamper detection method is conceived. According to a third aspect of the present disclosure, a corresponding non-transitory computer-readable storage medium comprising instructions is provided.

20 Claims, 10 Drawing Sheets

(56) References Cited

U.S. PATENT DOCUMENTS

| | | | |
|---|---|---|---|
| 6,888,509 B2 | 5/2005 | Atherton | |
| 7,652,577 B1 * | 1/2010 | Madhow | G06K 7/10346 |
| | | | 340/572.1 |
| 9,741,231 B2 * | 8/2017 | Brandl | G08B 21/185 |
| 2005/0017845 A1 * | 1/2005 | Shellans | G06K 19/077 |
| | | | 340/10.4 |
| 2005/0051624 A1 * | 3/2005 | Kipp | B65D 51/24 |
| | | | 235/385 |
| 2008/0169926 A1 * | 7/2008 | Reep | G06K 19/07749 |
| | | | 340/572.1 |
| 2009/0302111 A1 * | 12/2009 | Woodard | G08B 13/2408 |
| | | | 235/449 |
| 2011/0043339 A1 * | 2/2011 | McGregor | G06K 19/07372 |
| | | | 340/10.4 |
| 2012/0218110 A1 | 8/2012 | Forster | |
| 2013/0019114 A1 * | 1/2013 | Sumida | G06F 1/26 |
| | | | 713/300 |
| 2013/0135104 A1 * | 5/2013 | Nikkanen | G06K 19/07372 |
| | | | 340/572.1 |
| 2014/0263659 A1 * | 9/2014 | Kervinen | G06K 19/027 |
| | | | 235/488 |
| 2015/0254961 A1 * | 9/2015 | Brandl | G06K 19/07372 |
| | | | 340/663 |
| 2016/0036588 A1 * | 2/2016 | Thackston | H04L 9/321 |
| | | | 713/168 |
| 2018/0129926 A1 * | 5/2018 | Riedel | G06K 19/07372 |

* cited by examiner

ELECTRONIC TAMPER DETECTION DEVICE

CROSS-REFERENCE TO RELATED APPLICATIONS

This application claims the priority under 35 U.S.C. § 119 of European patent application no. 16182327.3, filed on Aug. 2, 2016, the contents of which are incorporated by reference herein.

FIELD

The present disclosure relates to an electronic tamper detection device. Furthermore, the present disclosure relates to a corresponding tamper detection method, and to a corresponding non-transitory computer-readable storage medium comprising instructions.

BACKGROUND

Electronic tamper detection devices may be used to detect tampering with closed or sealed products, such as bottles, packets and other containers. For example, in the spirits industry and the pharmaceutical industry such tamper detection devices may be useful. Tamper detection devices often contain a so-called tamper loop. A tamper loop may for example comprise a conductive wire that is broken when a closure or seal in which it is concealed is broken. Frequently used tamper detection devices are radio frequency identification (RFID) or near field communication (NFC) tags comprising or extended with a tamper loop. It may be desirable to improve these tamper detection devices, so that tamper attempts can be detected with a higher degree of reliability while not overloading the often weak electrical power supply of such devices.

SUMMARY

According to a first aspect of the present disclosure, an electronic tamper detection device is provided, comprising a radio frequency antenna, a tamper loop, a power level determination unit and a tamper measurement unit, wherein: the power level determination unit is configured to determine a power level of the tamper detection device; the tamper measurement unit is configured to generate a measurement signal and to transmit said measurement signal through the tamper loop; the tamper measurement unit is further configured to adapt the measurement signal in dependence on the power level.

In one or more embodiments, the power level corresponds to the strength of a radio frequency field present on the radio frequency antenna and the power level determination unit is configured to detect said strength, or the power level corresponds to a chip supply voltage and the power level determination unit is configured to monitor said chip supply voltage.

In one or more embodiments, the tamper measurement unit is further configured to receive the measurement signal from the tamper loop or to receive a signal derived from the measurement signal from the tamper loop.

In one or more embodiments, the tamper measurement unit is configured to change the magnitude of the measurement signal in response to a change of the power level.

In one or more embodiments, the field strength detection unit comprises a limiter control circuit operatively coupled to the tamper measurement unit, and the tamper measurement unit is configured to change the magnitude of the measurement signal under control of the limiter control circuit.

In one or more embodiments, the tamper measurement unit is configured to change the waveform of the measurement signal in response to a change of the power level.

In one or more embodiments, the waveform of the measurement signal is a complex waveform, in particular a waveform that represents a bit stream, if the power level exceeds a predefined threshold.

In one or more embodiments, the waveform of the measurement signal represents a constant current if the power level does not exceed said threshold.

In one or more embodiments, the device is an RFID-enabled tamper detection device.

In one or more embodiments, the device is a BLE-enabled tamper detection device.

In one or more embodiments, the tamper measurement unit comprises a voltage-controlled current source, a current-controlled current source, a current-controlled voltage source, or a voltage-controlled voltage source.

In one or more embodiments, the tamper loop is a conductive wire.

In one or more embodiments, the tamper measurement unit is configured to generate a tamper measurement signal for further processing by a digital circuit.

According to a second aspect of the present disclosure, a tamper detection method using an electronic tamper detection device is conceived, wherein said device comprises a radio frequency antenna, a tamper loop, a power level determination unit and a tamper measurement unit, the method comprising: the power level determination unit determines a power level of the tamper detection device; the tamper measurement unit generates a measurement signal and transmits said measurement signal through the tamper loop; the tamper measurement unit adapts the measurement signal in dependence on the power level.

According to a third aspect of the present disclosure, a non-transitory computer-readable storage medium is provided, comprising instructions which, when executed by a processing unit, carry out or control a method of the kind set forth.

DESCRIPTION OF DRAWINGS

Embodiments will be described in more detail with reference to the appended drawings, in which.

DESCRIPTION OF EMBODIMENTS

Figure 1:
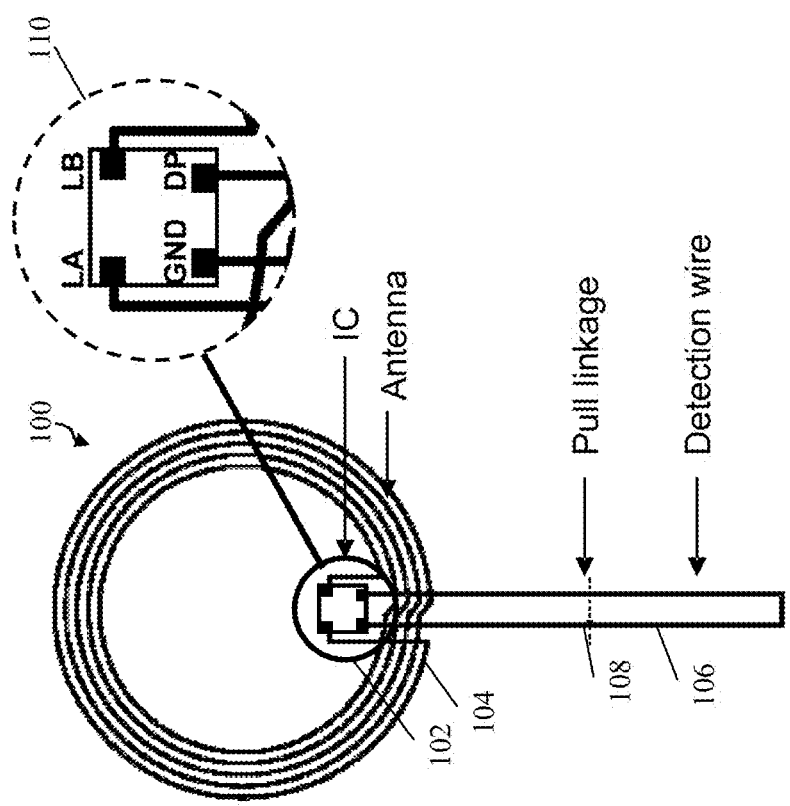
FIG. 1 shows an example of a tamper detection device.

FIG. 1 shows an example of an electronic tamper detection device 100. In this example, the tamper detection device 100 is an RFID or NFC tag equipped with a tamper loop. The tag may be a so-called passive tag, i.e. a tag powered by an electromagnetic field generated by an external device (not shown). The tag comprises an integrated circuit 102 (i.e., a tag circuit or "chip") which is coupled through contact pads LA and LB to an antenna 104 for establishing wireless communication with said external device. The tamper loop is formed by a detection wire 106 (i.e., a conductive wire) which is coupled to the integrated circuit 102 through contact pads GND and DP. The detection wire 106 may for example be concealed in a closure comprising a pull linkage 108. In operation, once the detection wire 106 (tamper loop) has been broken (e.g., at the pull linkage 108) and the tag is powered by said electromagnetic field, the tag can detect that the detection wire 106 has been broken and act accordingly.

Thus, in the tamper detection device 100 shown in FIG. 1, there is, in addition to the radio frequency (RF) antenna that provides the chip 102 with power and that is used for communication with an external device, a tamper loop 106 which may be broken in a tamper attempt (e.g., by manipulating the closure of a bottle). The open/closed status of this loop can be detected by the RFID chip 102 and communicated to a reader (not shown). While the tag shown in FIG. 1 operates in the high-frequency (HF) band or range, tags supplied by a low-frequency (LF) or ultra-high frequency (UHF) field may also be equipped with a tamper loop of the kind set forth.

Examples of RFID devices equipped with tamper loops have been described in US 2013/0135104 A1, U.S. Pat. No. 6,888,509 B2, and US 2012/0218110 A1. Passive RFID tags should be very energy-efficient as they should be able to function when they are supplied by weak fields. This requires also the tamper measurement to be energy-efficient, i.e. the measurement current to be low, and in consequence the measurement result is susceptible to disturbances from the field. The difference between the minimum and maximum field strength at which the chip 102 must function can yet be in the range of several decades. In some examples there is not only an energy transfer from the field to the tag's antenna 104, but also an unwanted coupling to the tamper loop 106. That is to say, when the chip 102 is exposed to high field strengths and a measurement of the status of the tamper loop 106 is done, this coupling may lead to a disturbance of the measurement signal and therefore to false detections (i.e., the chip 102 detects an open tamper loop 106, although the loop 106 is closed) or to false non-detections (i.e., the chip 102 detects a closed tamper loop 106, although the loop 106 is open). Improvements that are energy-efficient and robust against disturbances of the measurement signal will now be discussed.

Figure 2:
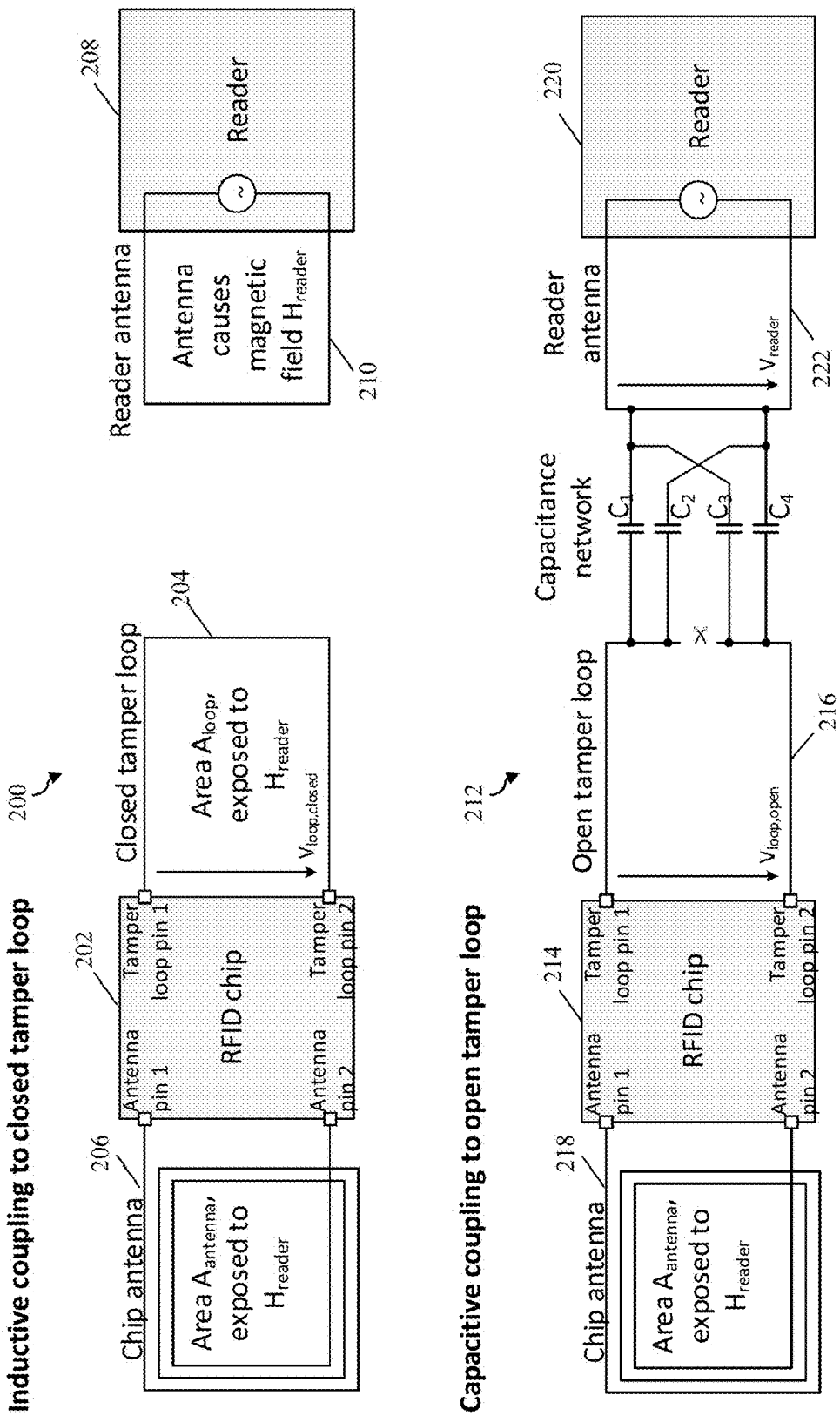
FIG. 2 shows examples of RFID systems and of disturbances coupled to their tamper loops.

FIG. 2 shows examples of RFID systems 200, 212 and of disturbances coupled to their tamper loops. In particular, it shows examples of RFID systems 200, 212 in which disturbances of a tamper measurement signal may occur. When a passive RFID tag with a tamper loop is powered by a reader, then not only the chip antenna, but unfortunately also the tamper loop is exposed to the RF field and therefore the tamper measurement can be disturbed by the field. In HF operation two types of disturbances can be distinguished. A first type of disturbance is shown in the upper part of FIG. 2; this type of disturbance may occur when an RFID system 200 uses inductive coupling. In particular, when a reader 208 provides a magnetic field $H_{reader}$ which induces a voltage $V_{loop,closed}$ in the closed tamper loop 204, then $V_{loop,closed}$ is proportional to $A_{loop}*H_{reader}$ and therefore a large tamper loop or a strong field can cause a high voltage that results in a wrong tamper measurement (i.e., a false detection: the tamper loop 204 seems open although it is closed). Restricting $A_{loop}$ or $H_{reader}$ mitigates this problem, but such restrictions may not be possible in a final product. A second type of disturbance is shown in the lower part of FIG. 2; this type of disturbance may occur when the open tamper loop 216 of an RFID system 212 is exposed to capacitive coupling to the reader antenna 222. In particular, in case of an open tamper loop 216 a potential difference $V_{reader}$ between two zones of the reader antenna 222 can be capacitively coupled to the two remaining wires of the tamper loop 216 and cause a voltage $V_{loop,open}$. A strong capacitive coupling or a high voltage at the reader antenna 222 can cause a wrong tamper measurement (i.e. a false non-detection: the tamper loop 216 seems closed although it is open). It is noted that the coupling behavior of a UHF tag is different. For instance, a UHF tag antenna is not a loop antenna but a dipole antenna and an open tamper loop may also act as such a dipole antenna receiving energy from the radiative field. However, it still occurs that a stronger field provides the chip with more energy but also exposes the tamper loop to more disturbances.

Therefore, in accordance with the present disclosure, an electronic tamper detection device is provided, comprising a radio frequency antenna, a tamper loop, a power level determination unit and a tamper measurement unit. The power level determination unit is configured to detect a power level of the tamper detection device. The tamper measurement unit is configured to generate a measurement signal and to transmit said measurement signal through the tamper loop. Furthermore, the tamper measurement unit is configured to adapt the measurement signal in dependence on the power level. In this way, the tamper measurement robustness may be made dependent on the availability of energy. For example, the power level determination unit may detect the strength of the RF field present on the antenna, and when the field is weak, the amount of available energy is low, but also disturbances are low, so a simple and energy-efficient tamper measurement can be performed. Furthermore, when the field is strong, disturbances are high, but the amount of available energy is also high, so a more complex and less energy-efficient tamper measurement can be performed. It is noted that, although the presently disclosed device and method are described in the context of RFID systems, their application is not limited thereto. The presently disclosed device and method may also be applied to advantage in other types of communication systems, such as Bluetooth Low Energy (BLE) systems and other low-power wireless communication systems. In that case, the tamper detection device may be a BLE-enabled tamper detection device, for example.

In one or more embodiments, the power level corresponds to the strength of a radio frequency field present on the radio frequency antenna and the power level determination unit is configured to detect said strength. Alternatively, the power level corresponds to a chip supply voltage and the power level determination unit is configured to monitor said chip supply voltage. More specifically, the power level determination unit may detect the strength of the RF field directly, or it may monitor the chip supply voltage which is dependent on the strength of the RF field.

In one or more embodiments, the tamper measurement unit is further configured to receive the measurement signal from the tamper loop or to receive a signal derived from the measurement signal from the tamper loop. More specifically, in a practical and efficient implementation, the tamper measurement unit also contains a receiver for the measurement signal itself (e.g., measurement current is injected on one side of the loop and received on other side of the loop) or a signal derived from the measurement signal (e.g., measurement current is injected on one side of the loop and the resulting voltage is received on the same side of the loop).

In one or more embodiments, the tamper measurement unit is configured to change the magnitude of the measurement signal in response to a change of the power level. In this way, a practical and efficient implementation may be realized. For example, in case the power level corresponds to the strength of the RF field, the measurement current may be monotonically dependent on the detected strength of the RF field.

Figure 3A:
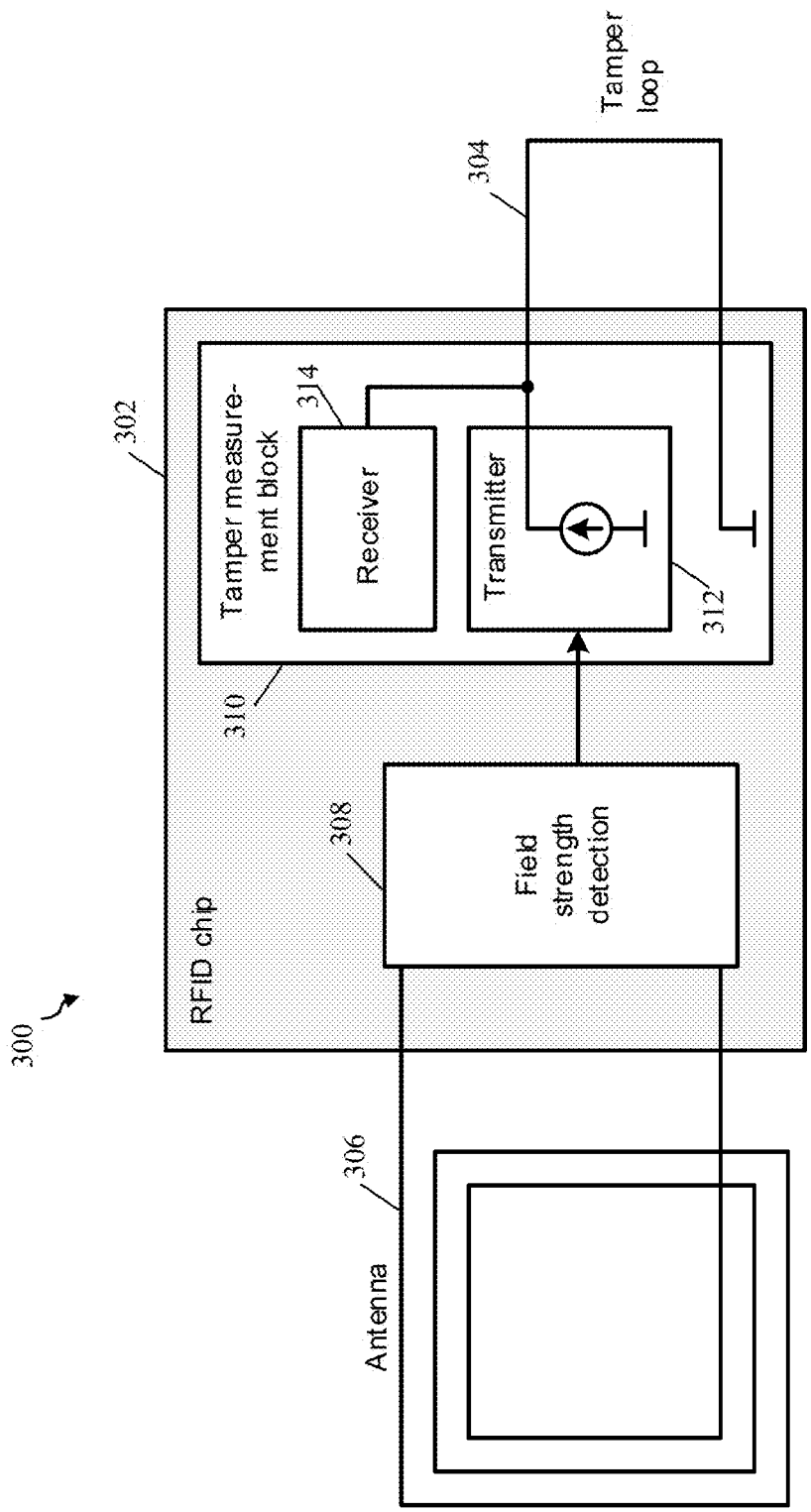
FIG. 3A shows an illustrative embodiment of a tamper detection device.

FIG. 3A shows an illustrative embodiment of a tamper detection device 300. The tamper detection device 300 comprises an RFID chip 302 operatively coupled to an RF antenna 306. More specifically, the RF antenna 306 is coupled to a field strength detection unit 308 comprised in the RFID chip 302. Furthermore, the tamper detection device 300 comprises a tamper loop 304 operatively coupled to the RFID chip 302. More specifically, the tamper loop 304 is coupled to a transmitter 312 and receiver 314 in a tamper measurement block 310 of the RFID chip 302. In operation, the field strength detection unit 308 detects the strength of the RF field present on the antenna 306. Furthermore, the transmitter 312 adjusts the measurement current in dependence on the field strength detected by the field strength detection unit 308. This embodiment enables a stronger measurement current (and therefore a more robust measurement) when a stronger field is available. In this way, the probability of false non-detections may be reduced. A detailed implementation of this embodiment is shown in FIG. 4.

Figure 3B:
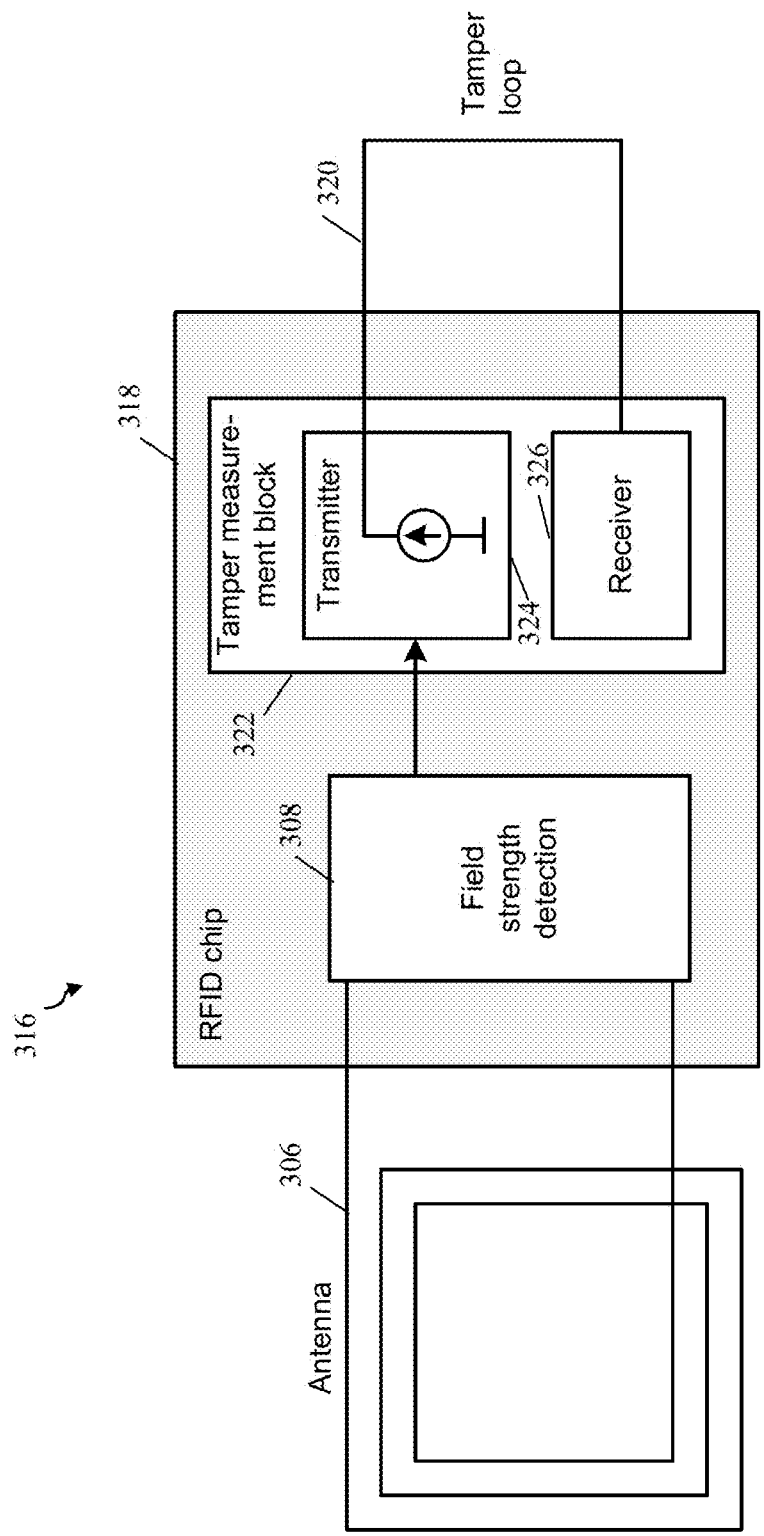
FIG. 3B shows another illustrative embodiment of a tamper detection device.
Figure 6:
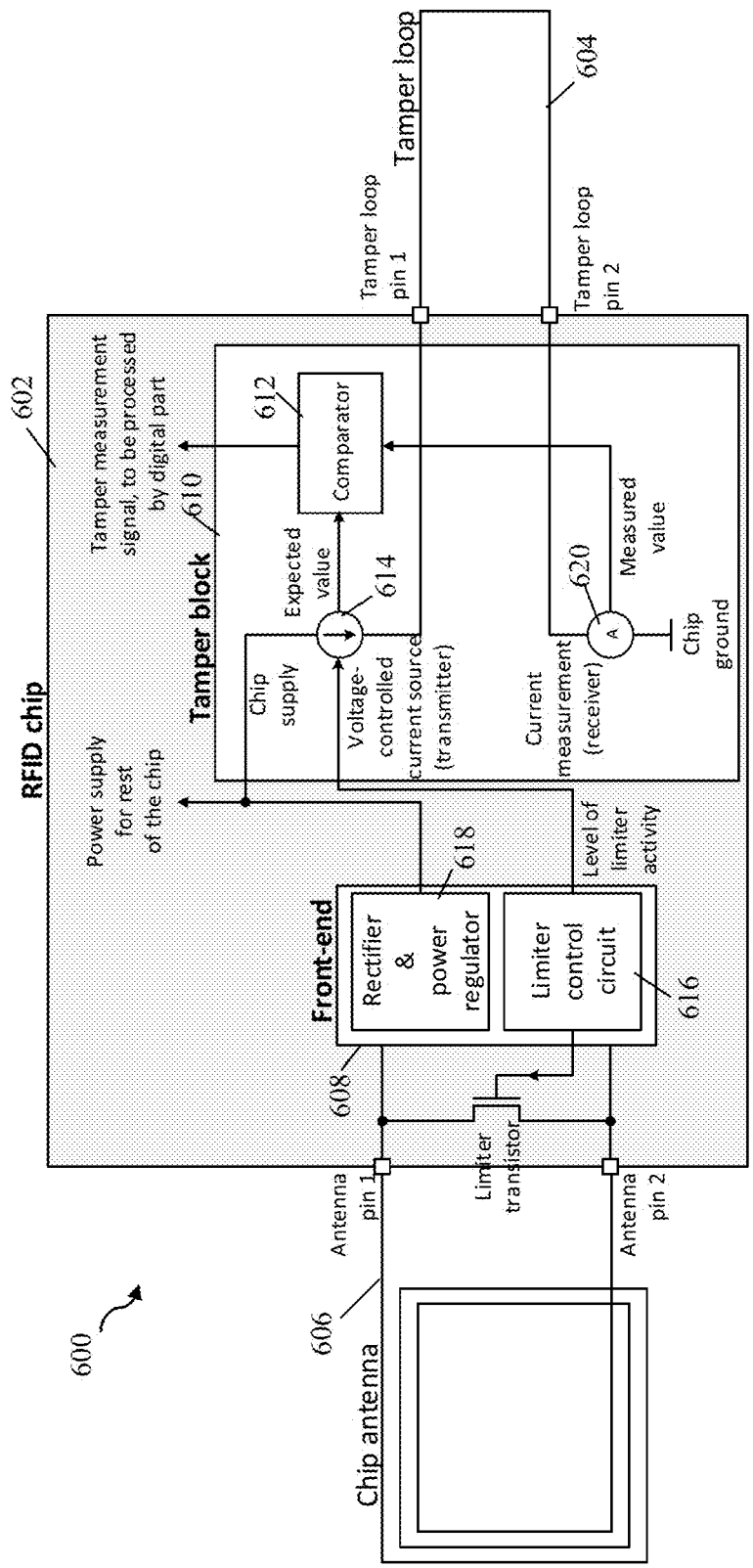
FIG. 6 shows a further illustrative embodiment of a tamper detection device.

FIG. 3B shows another illustrative embodiment of a tamper detection device 316. The tamper detection device 316 comprises an RFID chip 318 operatively coupled to an RF antenna 306. More specifically, the RF antenna 306 is coupled to a field strength detection unit 308 comprised in the RFID chip 318. Furthermore, the tamper detection device 316 comprises a tamper loop 320 operatively coupled to the RFID chip 318. More specifically, the tamper loop 320 is coupled between a transmitter 324 and receiver 326 in a tamper measurement block 322 of the RFID chip 302. In operation, the field strength detection unit 308 detects the strength of the RF field present on the antenna 306. Furthermore, the transmitter 324 adjusts the measurement current in dependence on the field strength detected by the field strength detection unit 308. This embodiment also enables a stronger measurement current (and therefore a more robust measurement) when a stronger field is available. In this way, the probability of false detections and the probability of false non-detections may be reduced. A detailed implementation of this embodiment is shown in FIG. 6.

Figure 3C:
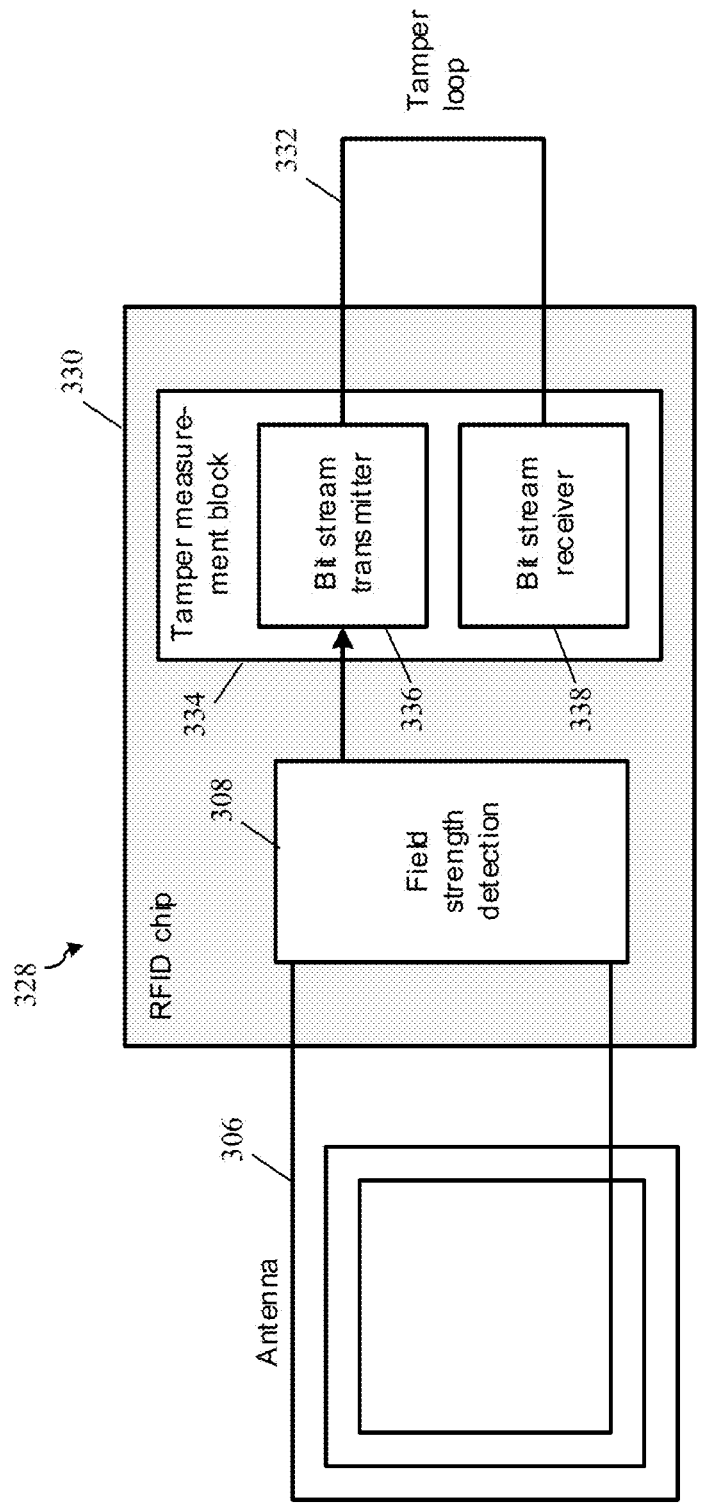
FIG. 3C shows a further illustrative embodiment of a tamper detection device.
Figure 7:
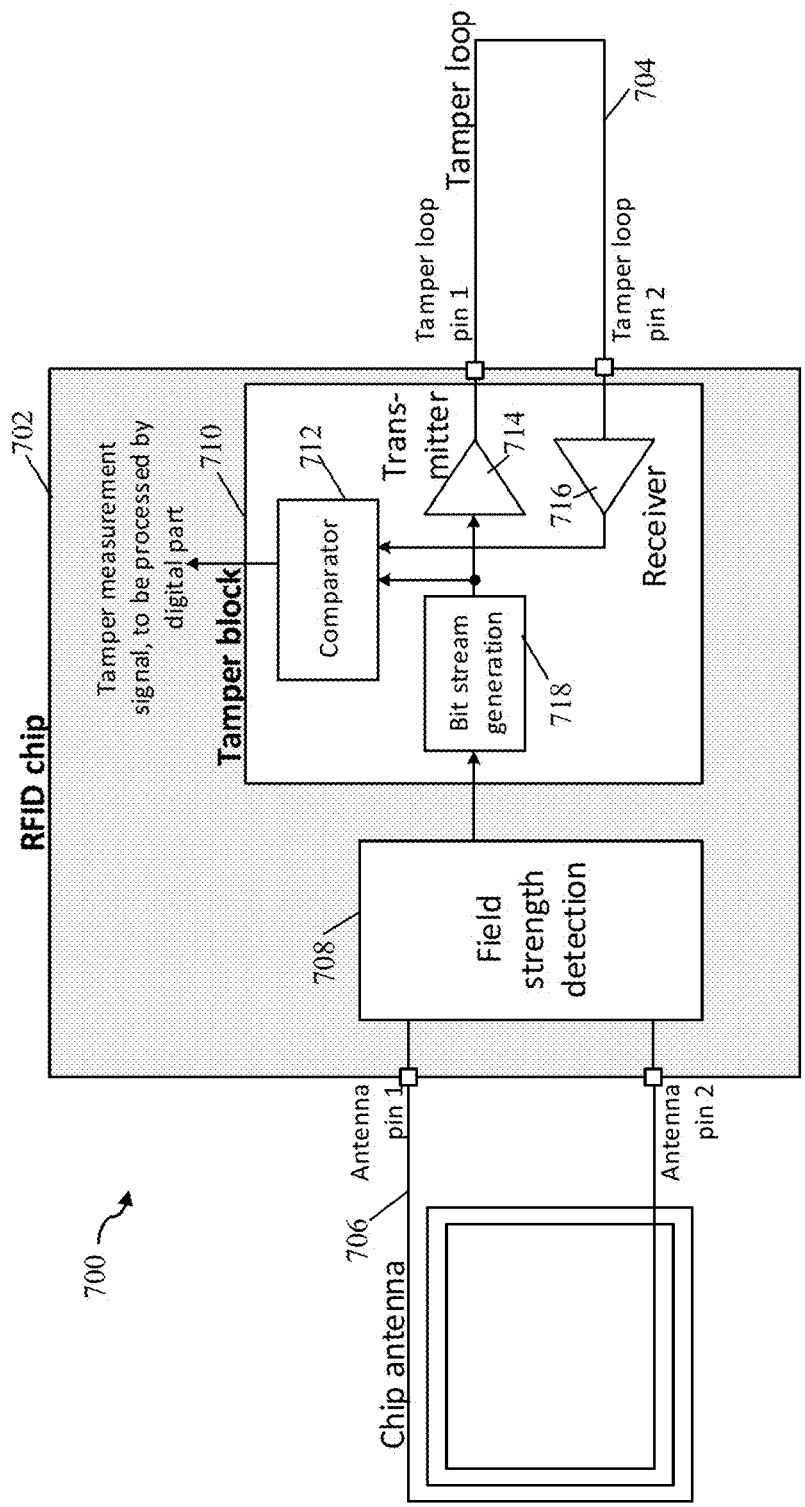
FIG. 7 shows a further illustrative embodiment of a tamper detection device.

FIG. 3C shows a further illustrative embodiment of a tamper detection device 328. The tamper detection device 328 comprises an RFID chip 330 operatively coupled to an RF antenna 306. More specifically, the RF antenna 306 is coupled to a field strength detection unit 308 comprised in the RFID chip 330. Furthermore, the tamper detection device 328 comprises a tamper loop 332 operatively coupled to the RFID chip 330. More specifically, the tamper loop 332 is coupled between a bit stream transmitter 336 and a bit stream receiver 338 in a tamper measurement block 334 of the RFID chip 330. In operation, the field strength detection unit 308 detects the strength of the RF field present on the antenna 306. Furthermore, the bit stream transmitter 336 may transmit a bit stream corresponding to a complex waveform through the tamper loop 332 if the strength of the RF field exceeds a predefined threshold. Furthermore, the bit stream receiver 338 may receive the bit stream transmitted through the tamper loop 332 and verify if the bit stream is unaltered, for example within a given error margin. This embodiment may prevent false non-detections when the field is sufficiently strong to allow digital patterns to be sent. A detailed implementation of this embodiment is shown in FIG. 7.

Figure 4:
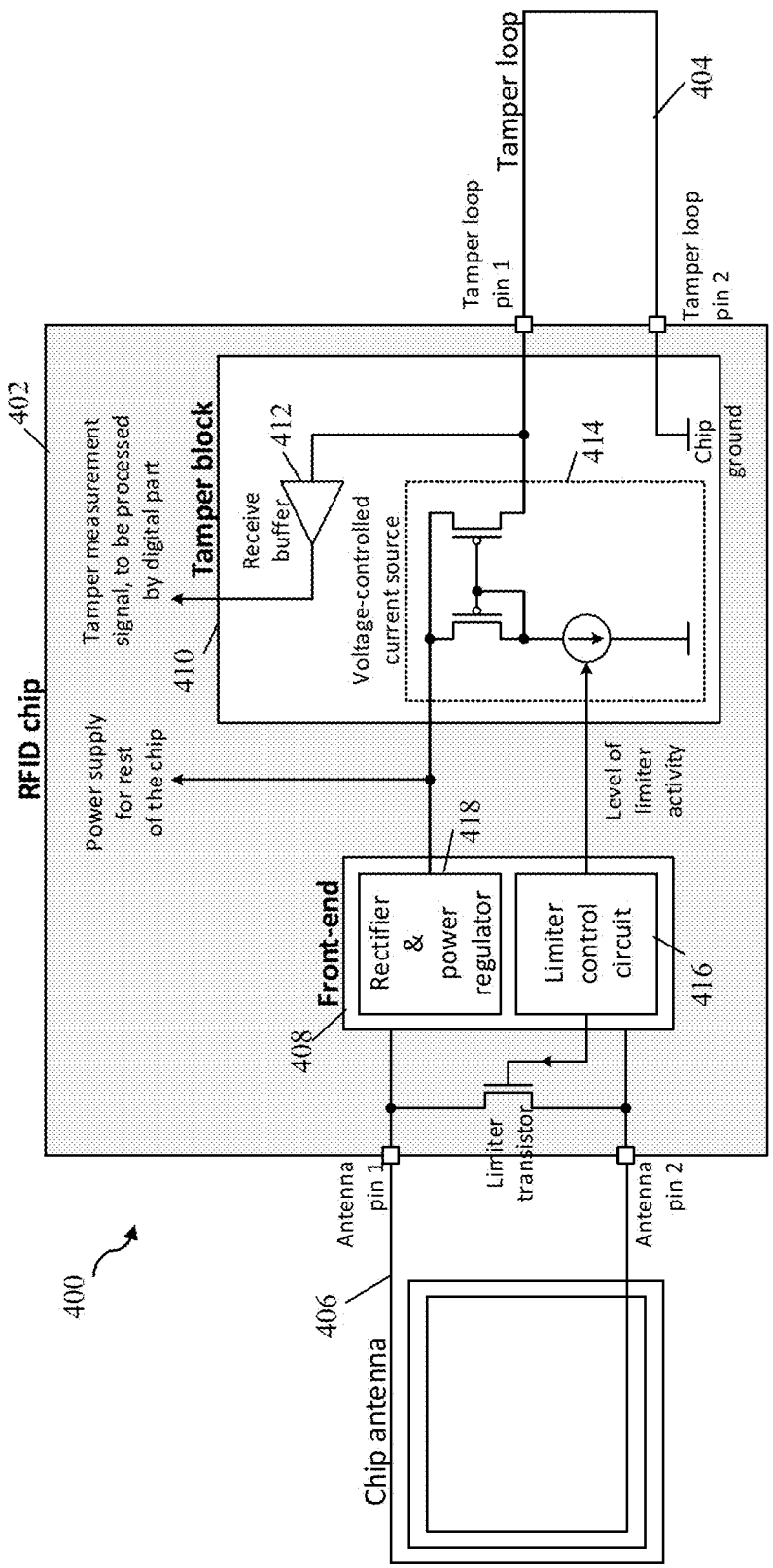
FIG. 4 shows a further illustrative embodiment of a tamper detection device.

FIG. 4 shows another illustrative embodiment of a tamper detection device 400. In particular, FIG. 4 shows a detailed implementation of the embodiment shown in FIG. 3A. The tamper detection device 400 comprises an RFID chip 402 which is operatively coupled to a chip antenna 406 (i.e., an RF antenna) through antenna pins. Furthermore, the tamper detection device 400 comprises a tamper loop 404 which is operatively coupled to the RFID chip 402 through tamper loop pins. In particular, the tamper loop 404 is coupled to a tamper block 410 (i.e., a tamper measurement block). Furthermore, the chip antenna 406 is coupled to a front-end 408 of the RFID chip 402. The front-end 408 comprises a rectifier and power regulator 418 and a limiter control circuit 416. The tamper block 410 comprises a voltage-controlled current source 414, a receive buffer 412 and a connection to ground. In operation, the tamper block 410 may output a tamper measurement signal to be processed by one or more digital components (not shown) of the RFID chip 402. Furthermore, the rectifier and power regulator 418 may act as a power supply for other components (not shown) of the RFID chip 402. In this embodiment, the front-end 408 acts both as a power supply for generating the tamper measurement current and as a field strength detection unit. In particular, rectifier and power regulator 418 supplies power to the voltage-controlled current source 414 so that the latter may transmit a tamper measurement current through the tamper loop 404. Furthermore, the limiter control circuit 416 may detect the strength of the RF field present on the chip antenna 406 and output a voltage to control the current generated by the voltage-controlled current source 414 of the tamper block 410. Thus, the limiter control circuit 416 facilitates controlling the tamper measurement current in dependence on the strength of the RF field. Furthermore, the use of a voltage-controlled current source 414 in the tamper block 410 results in a practical and efficient implementation. Alternatively, the measurement signal could be a voltage and it could also be controlled by a current. Thus, the tamper measurement unit may also comprise a current-controlled current source, a current-controlled voltage source, or a voltage-controlled voltage source.

Thus, FIG. 4 shows a possible implementation of an RFID tag with robust tamper functionality. The robustness is obtained by a field-strength-dependent increase of the tamper measurement current that is injected into the tamper loop 404 by a voltage-controlled current source 414. In case of an open tamper loop a high measurement current helps to reliably overcome capacitive coupling from a reader antenna and to pull the tamper loop pin 1 to a "high" level, which is then communicated to a digital part of the RFID chip 402 as a tamper measurement signal indicative of "loop open" information. Thus, this implementation mitigates the risk of false non-detections.

Furthermore, a typical implementation of an RFID tag contains a limiter transistor, which avoids an overvoltage at the chip antenna pins in case of a strong reader field $H_{reader}$. The limiter transistor is gradually switched on when $H_{reader}$ increases and the level of limiter activity indicates if there is sufficient power available to increase the tamper measurement current. Therefore, the limiter control circuit 416 can be used not only to control the limiter transistor, but also the strength of the tamper measurement current. In this way, the tamper measurement current control may be implemented in an efficient yet reliable way. In a practical and efficient implementation, the tamper loop 404 is a conductive wire through which the tamper measurement current is transmitted.

Figure 5:
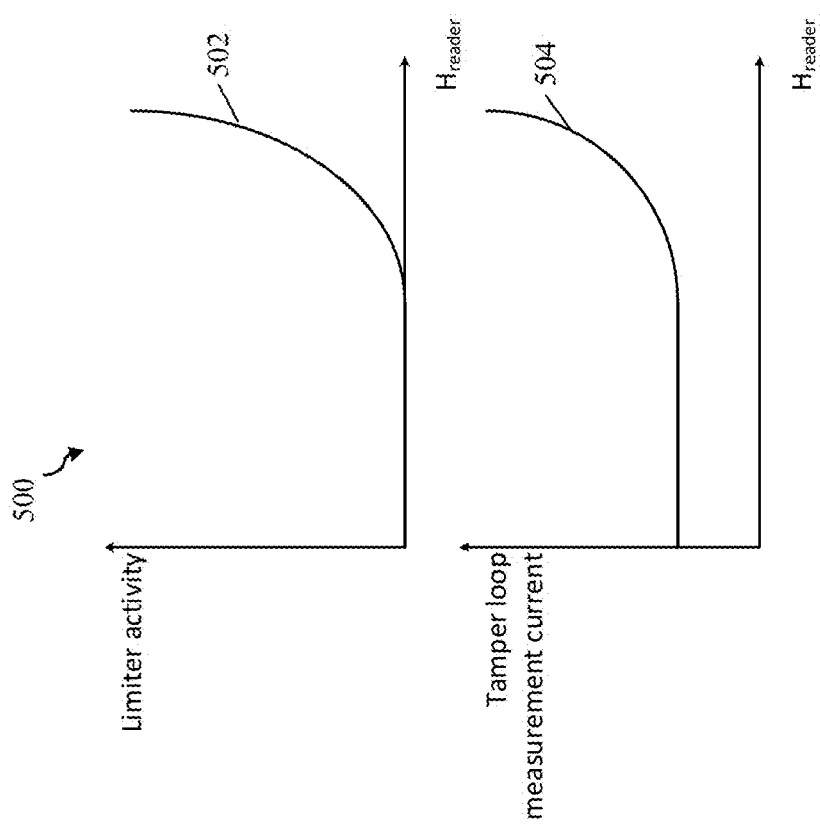
FIG. 5 shows a relationship between limiter activity and tamper loop measurement current.

FIG. 5 shows a relationship 500 between limiter activity 502 and tamper loop measurement current 504. In this example, which is based on the embodiment shown in FIG. 4, the tamper loop measurement current 504 (i.e., the tamper measurement current) is a function of the limiter activity 502. In this particular example, the tamper loop measurement current 504 increases in a similar way as the limiter activity 502. The skilled person will appreciate that the exact relation between the tamper loop measurement current 504 and the limiter activity 502 depends on the individual application.

A possibility to allow a higher tamper measurement current when a stronger field is available is to directly observe the internal chip supply voltage (i.e., the output of the rectifier and power regulator 418) instead of the limiter activity level. As long as the chip supply voltage is at the nominal value, a high tamper measurement current is allowed. When the RF field on the chip antenna 406 is weak, a high tamper measurement current would cause a drop of the chip supply, which can be avoided by a regulator loop that monitors the chip supply voltage and decreases the tamper measurement current as soon as it detects a drop of that voltage.

FIG. 6 shows yet another illustrative embodiment of a tamper detection device 600. In particular, FIG. 6 shows a detailed implementation of the embodiment shown in FIG. 3B. The tamper detection device 600 comprises an RFID chip 602 which is operatively coupled to a chip antenna 606 (i.e., an RF antenna) through antenna pins. Furthermore, the tamper detection device 600 comprises a tamper loop 604 which is operatively coupled to the RFID chip 602 through tamper loop pins. In particular, the tamper loop 604 is coupled to a tamper block 610 (i.e., a tamper measurement block). Furthermore, the chip antenna 606 is coupled to a front-end 608 of the RFID chip 602. The front-end 608 comprises a rectifier and power regulator 618 and a limiter control circuit 616. The tamper block 610 comprises a voltage-controlled current source 614, a comparator 612 and a measurement current receiver 620 that is connected to ground. In operation, the tamper block 610 may output a tamper measurement signal to be processed by one or more digital components (not shown) of the RFID chip 602. Furthermore, the rectifier and power regulator 618 may act as a power supply for other components (not shown) of the RFID chip 602. In this embodiment, the front-end 608 acts both as a power supply for generating the tamper measurement current and as a field strength detection unit. In particular, rectifier and power regulator 618 supplies power to the voltage-controlled current source 614 so that the latter may transmit a tamper measurement current through the tamper loop 604. Furthermore, the limiter control circuit 616 may detect the strength of the RF field present on the chip antenna 606 and output a voltage to control the current generated by the voltage-controlled current source 614 of the tamper block 610. The comparator 612 compares an expected value of the received tamper measurement current, output by the voltage-controlled current source 614, with the current received by the receiver 620. If the received current substantially matches the expected value, the comparator 612 outputs a tamper measurement signal indicative of a closed status of the tamper loop 604.

Thus, FIG. 6 shows a possible implementation for reliably detecting a closed tamper loop. The "closed"-status of the tamper loop 604 is verified by checking if the current received at tamper loop pin 2 is the same (within tolerance ranges) as the current transmitted at tamper loop pin 1. High disturbances at the tamper loop 604 may cause an alteration of the received current and therefore a "false detection". This risk can be mitigated by increasing the tamper measurement current when a strong field is available and by consequently decreasing the relative amount of disturbance current caused by the RF field.

FIG. 7 shows a further illustrative embodiment of a tamper detection device 700. In particular, FIG. 7 shows a detailed implementation of the embodiment shown in FIG. 3C. The tamper detection device 700 comprises an RFID chip 702 which is operatively coupled to a chip antenna 706 (i.e., an RF antenna) through antenna pins. Furthermore, the tamper detection device 700 comprises a tamper loop 704 which is operatively coupled to the RFID chip 702 through tamper loop pins. In particular, the tamper loop 704 is coupled to a tamper block 710 (i.e., a tamper measurement block). Furthermore, the chip antenna 706 is coupled to a field strength detection unit 708 of the RFID chip 702. The tamper block 710 comprises a bit stream generation unit 718 which is operatively coupled to the field strength detection unit 708. Furthermore, the tamper block 710 comprises a current transmitter 714, a current receiver 716 and a comparator 712. It is noted that, instead of a current, also a voltage may be used as the measurement signal. In operation, the tamper block 710 may output a tamper measurement signal to be processed by one or more digital components (not shown) of the RFID chip 702. Furthermore, the field strength detection unit 708 may detect the strength of the RF field present on the chip antenna 706. If the field strength exceeds a predefined threshold, the bit stream generation unit 718 generates a bit stream and the transmitter 714 transmits a tamper measurement signal having a complex waveform that represents said bit stream through the tamper loop 704. The comparator 712 compares the bit stream output by the bit stream generation unit 718 with the waveform of the current received by the receiver 716. If the waveform of the received current substantially matches the bit stream, the comparator 712 outputs a tamper measurement signal indicative of a closed status of the tamper loop 704.

Figure 8:
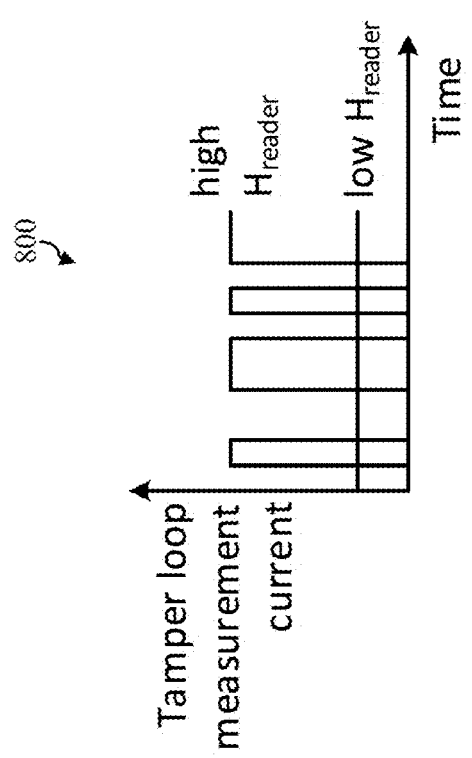
FIG. 8 shows a relationship between tamper loop measurement current and time in the embodiment shown in FIG. 7.

FIG. 8 shows a relationship 800 between tamper loop measurement current and time in the embodiment shown in FIG. 7. It can be seen that if the field strength exceeds a predefined threshold (i.e., $H_{reader}$ is high), the bit stream generation unit 718 generates a bit stream and the transmitter 714 transmits a tamper measurement signal having a complex waveform that represents said bit stream through the tamper loop 704. If the field strength does not exceed said threshold (i.e. $H_{reader}$ is low), then a weak constant current is sent through the tamper loop 704.

Thus, in one or more embodiments, the tamper measurement unit is configured to change the waveform of the tamper measurement signal in response to a change of the power level. In this way, an open tamper loop can be detected in a more reliable manner. In particular, in case of an open tamper loop, it is very unlikely that distortions from the field cause the same waveform at the receiver part of the tamper measurement circuit than the waveform that is sent by the transmitter part. In one or more embodiments, the waveform of the tamper measurement signal is a complex waveform if the power level exceeds a predefined threshold. On the other hand, if the power level does not exceed said threshold, the waveform of the tamper measurement signal may be a simple waveform. Thus, another implementation option to obtain a robust tamper measurement is to send more complex waveforms over the tamper loop when a stronger field is available, for example. This implementation may prevent false non-detections when the field is sufficiently strong to allow digital patterns to be sent. For example, for a weak RF field (i.e., a field whose strength is below a threshold defined by a given application) the tamper measurement current may be constant, while for a stronger RF field an additional functionality is switched on that allows sending and receiving a digital pattern. In a practical and efficient implementation, the complex waveform represents a bit stream. In short, not only the strength or magnitude of the tamper measurement current, but also its wave shape (i.e., waveform) can be made dependent on the power level.

FIG. 7 shows a possible implementation of such embodiments. When the field strength is low, then a simple tamper loop measurement can be done such as sending a weak constant current through the tamper loop 704. When the field strength is sufficiently high, then additional power-consuming circuitry (i.e. the bit stream generation unit 718 and the comparator 712) can be switched on that sends a digital bit stream through the loop 704 and checks if the sent data is received correctly. A correct reception is then a reliable indicator of a closed tamper loop 704. If the loop 704 is open, then it is very unlikely that the disturbances caused by the field are causing the same bit stream at the tamper measurement receiver 716 than the one that is sent by the transmitter 714. Such an implementation may therefore avoid false non-detections.

The above-described embodiments are, among others, based on the insight that the following relationship exists between the strength of the RF field and the need for disturbance immunity. If the field is weak, then the chip supply will not be strong, so a tamper measurement should be power-economic. Such a tamper measurement is not robust against disturbances caused by the field. However, this is anyhow not required as the disturbances caused by the field are low. If the field is strong, then the chip supply will be strong, so it will be possible to perform a power-consuming tamper measurement. Therefore the tamper measurement is robust against the disturbances that are caused by the strong field.

It is noted that the embodiments above have been described with reference to different subject-matters. In particular, some embodiments may have been described with reference to method-type claims whereas other embodiments may have been described with reference to device-type claims. However, a person skilled in the art will gather from the above that, unless otherwise indicated, in addition to any combination of features belonging to one type of subject-matter also any combination of features relating to different subject-matters, in particular a combination of features of the method-type claims and features of the device-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 tamper detection device
102 integrated circuit
104 antenna
106 detection wire
108 pull linkage
110 detailed view of integrated circuit
200 RFID system
202 RFID chip
204 tamper loop
206 chip antenna
208 reader
210 reader antenna
212 RFID system
214 RFID chip
216 tamper loop
218 chip antenna
220 reader
222 reader antenna
300 tamper detection device
302 RFID chip
304 tamper loop
306 antenna
308 field strength detection
310 tamper measurement block
312 transmitter
314 receiver
316 tamper detection device 318 RFID chip
320 tamper loop
322 tamper measurement block
324 transmitter
326 receiver
328 tamper detection device
330 RFID chip
332 tamper loop
334 tamper measurement block
336 bit stream transmitter
338 bit stream receiver
400 tamper detection device
402 RFID chip
404 tamper loop
406 chip antenna
408 front-end
410 tamper block
412 receive buffer
414 voltage-controlled current source
416 limiter control circuit
418 rectifier and power regulator
500 relationship between limiter activity and tamper loop measurement current
502 limiter activity
504 tamper loop measurement current
600 tamper detection device
602 RFID chip
604 tamper loop
606 chip antenna
608 front-end
610 tamper block
612 comparator
614 voltage-controlled current source (transmitter)
616 limiter control circuit
618 rectifier and power regulator
620 current measurement (receiver)
700 tamper detection device
702 RFID chip
704 tamper loop
706 chip antenna
708 field strength detection
710 tamper block
712 comparator
714 transmitter
716 receiver
718 bit stream generation
800 relationship between tamper loop measurement current and time

The invention claimed is:

1. An electronic tamper detection device comprising a radio frequency antenna, a tamper loop, a power level determination unit and a tamper measurement unit, wherein:
the power level determination unit is configured to determine a power level of the tamper detection device;
the tamper measurement unit is configured to generate a measurement signal and to transmit said measurement signal through the tamper loop;
the tamper measurement unit is further configured to adapt the measurement signal in dependence on the power level.

2. The device of claim 1, wherein the power level corresponds to the strength of a radio frequency field present on the radio frequency antenna and the power level determination unit is configured to detect said strength, or wherein the power level corresponds to a chip supply voltage and the power level determination unit is configured to monitor said chip supply voltage.

3. The device of claim 1, wherein the tamper measurement unit is further configured to receive the measurement signal from the tamper loop or to receive a signal derived from the measurement signal from the tamper loop.

4. The device of claim 1, wherein the tamper measurement unit is configured to change a magnitude of the measurement signal in response to a change of the power level.

5. The device of claim 4, wherein the power level determination unit comprises a limiter control circuit operatively coupled to the tamper measurement unit, and wherein the tamper measurement unit is configured to change the magnitude of the measurement signal under control of the limiter control circuit.

6. The device of claim 1, wherein the tamper measurement unit is configured to change a waveform of the measurement signal in response to a change of the power level.

7. The device of claim 6, wherein the waveform of the measurement signal is a complex waveform, in particular a waveform that represents a bit stream, if the power level exceeds a predefined threshold.

8. The device of claim 6, wherein the waveform of the measurement signal represents a constant current if the power level does not exceed said threshold.

9. The device of claim 1, being an RFID-enabled tamper detection device.

10. The device of claim 1, being a BLE-enabled tamper detection device.

11. The device of claim 1, wherein the tamper measurement unit comprises a voltage-controlled current source, a current-controlled current source, a current-controlled voltage source, or a voltage-controlled voltage source.

12. The device of claim 1, wherein the tamper loop is a conductive wire.

13. The device of claim 1, wherein the tamper measurement unit is configured to generate a tamper measurement signal for further processing by a digital circuit.

14. A tamper detection method using an electronic tamper detection device, wherein said device comprises a radio frequency antenna, a tamper loop, a power level determination unit and a tamper measurement unit, the method comprising:
the power level determination unit determines a power level of the tamper detection device;
the tamper measurement unit generates a measurement signal and transmits said measurement signal through the tamper loop;
the tamper measurement unit adapts the measurement signal in dependence on the power level.

15. A computer program product residing on a non-transitory computer-readable medium and comprising computer readable, computer executable instructions for causing an electronic tamper detection device to perform the following steps, wherein the electronic tamper detection device comprises a radio frequency antenna, a tamper loop, a power level determination unit and a tamper measurement unit:
the power level determination unit determines a power level of the tamper detection device;
the tamper measurement unit generates a measurement signal and transmits said measurement signal through the tamper loop;
the tamper measurement unit adapts the measurement signal in dependence on the power level.

16. The method of claim 14, wherein the tamper measurement unit adapts the measurement signal in dependence on the power level by:

changing a magnitude of the measurement signal in response to a change of the power level.

17. The method of claim 16, wherein the power level determination unit comprises a limiter control circuit operatively coupled to the tamper measurement unit, and wherein the tamper measurement unit is configured to change the magnitude of the measurement signal under control of the limiter control circuit.

18. The method of claim 14, wherein the tamper measurement unit adapts the measurement signal in dependence on the power level by:
changing a waveform of the measurement signal in response to a change of the power level.

19. The method of claim 18, wherein the waveform of the measurement signal is a complex waveform, in particular a waveform that represents a bit stream, if the power level exceeds a predefined threshold.

20. The method of claim 18, wherein the waveform of the measurement signal represents a constant current if the power level does not exceed said threshold.

* * * * *